(12) United States Patent
Dalton et al.

(10) Patent No.: US 6,170,507 B1
(45) Date of Patent: Jan. 9, 2001

(54) GAS VALVE WITH NATURAL/LP GAS CONVERSION CAPABILITY

(75) Inventors: James M. Dalton, Elk River, MN (US); Paul Dietiker, Redondo Beach, CA (US); Marvin D. Nelson, Savage, MN (US)

(73) Assignee: Honeywell International Inc., Morristown, NJ (US)

(*) Notice: Under 35 U.S.C. 154(b), the term of this patent shall be extended for 0 days.

(21) Appl. No.: 09/261,829

(22) Filed: Mar. 3, 1999

(51) Int. Cl.[7] .................................. G05D 16/06
(52) U.S. Cl. .............. 137/12; 137/269; 137/505.14; 137/505.46
(58) Field of Search ................... 137/269, 270, 137/271, 505, 505.14, 505.46, 505.47, 12

(56) References Cited

U.S. PATENT DOCUMENTS

| | | | |
|---|---|---|---|
| 3,180,356 | * 4/1965 | Galley . | |
| 4,265,270 | * 5/1981 | Satoh | 137/505.39 |
| 4,621,658 | 11/1986 | Buezis et al. | 137/505.41 |
| 4,637,429 | 1/1987 | Dietiker et al. | 137/505.14 |
| 5,435,343 | 7/1995 | Buezis | 137/505.14 |

\* cited by examiner

Primary Examiner—Stephen M. Hepperle
(74) Attorney, Agent, or Firm—Charles L. Rubow

(57) ABSTRACT

A convertible two-mode pressure regulator in which a main valve regulates fluid flow between an inlet and an outlet in response to a control pressure produced by a mechanically operated regulator valve, the control pressure depending on the outlet pressure and the force applied by a compression spring to a diaphragm carrying a regulator valve closure element. Compression of the regulator spring is controlled by a mechanical lever assembly and a shaft assembly which is selectively positionable by a selector knob to obtain higher or lower regulator spring force. Adjustable stops provide for individual adjustment of low and high outlet pressures for each of two pressure ranges.

21 Claims, 5 Drawing Sheets

GAS VALVE WITH NATURAL/LP GAS CONVERSION CAPABILITY

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to fluid pressure regulators, and more specifically, to pressure regulating valves convertible in the field with minimal parts replacement to separate output pressure ranges, such as those typically used in natural and LP fuel gas controls.

Applications have existed for some time for pressure regulating valves capable of regulating to either of two selected pressures. In general, these applications have been somewhat specialized, and the required volumes relatively small, thus providing little incentive for exploring nontraditional designs.

A pressure regulating valve requirement which impacts gas valve manufacturers and users results from the fact that both natural gas and gas produced from liquefied petroleum (LP) or propane are in common use as fuel gases. These gasses have different burning characteristics, and are supplied to a furnace or other burner apparatus under different pressures. Specifically, gas generated from liquefied petroleum has a faster flame front. Accordingly, it is supplied to a burner at a higher pressure, e.g., 10 inches $H_2O$, which induces more oxygen entrainment. In contrast, natural gas is typically supplied to a furnace or burner at a pressure of 3.5 inches $H_2O$. Accordingly, a pressure regulating gas valve for a furnace or other appliance must regulate to a higher pressure for LP gas than for natural gas.

There are various situations in which it is not known at the outset which type of fuel gas will be used, and/or in which the type of fuel gas may be changed at some point during the operating life of the furnace or other appliance. Either situation often occurs with a gas fireplace. Another common situation is in connection with new construction of a permanent fixed location dwellings. Initially natural gas may not be available because underground gas lines are not in place in the area, or because hook up to natural gas lines is delayed by frozen ground, or for other reasons.

Typical solutions in the past have been to either change out the entire gas valve at the time of conversion to a different fuel gas, or to replace certain components such as regulator springs or pressure regulator modules. Both of these solutions are undesirable for several reasons.

Although gas valves are available for operation with either natural gas or LP, an increasing need exists for a single gas valve with a simplified field selectable gas option.

The applicants have devised a design for such a valve which retains the advantageous features of prior limited purpose designs, while providing the capability of fuel type selection at the time of installation by replacement of a single simple part without disassembly of any other valve components.

BRIEF SUMMARY OF THE INVENTION

The invention is a pressure regulator having at least first and second modes of operation in each of two pressure ranges, which may correspond to pressure ranges suitable for natural and LP gas usage respectively. The pressure regulator includes a flow control means operable to vary the gas flow as a function of the extension of a regulator spring. Extension of the regulator spring may be determined by a lever assembly, which may be in turn moveable by a shaft assembly extending along an axis through an opening in the valve housing. The shaft assembly is contained within a selector assembly, and is manually adjustable along the axis relative to the flow control means. A first stop element is positionable along the axis to a user selected position, and sets the limiting position of the regulator spring and flow control means.

One of at least two spring compression caps may be chosen to bias the shaft assembly relative to the flow control means. When the first spring compression cap is assembled into its position, the shaft assembly is effectively biased toward the lever assembly, and travel of the lever assembly is limited to a first range of motion. When the second spring compression cap is assembled into its position, the shaft assembly is effectively biased away from the lever assembly, and travel of the lever assembly is limited to a second range of motion.

These and other features and advantages of the invention will become apparent from the following description of the preferred embodiments of the invention.

DETAILED DESCRIPTION OF THE INVENTION

In the following detailed description, references are made to the accompanying drawings which illustrate specific embodiments of the invention. These embodiments are described in sufficient detail to enable those skilled in the art to practice and use the invention, and it is to be understood that other embodiments may be utilized and that electrical, mechanical, logical and structural changes may be made without departing from the spirit and scope of the present invention. The following detailed description is, therefore, not to be taken in a limiting sense. The scope of the present invention is defined by the appended claims and their equivalents.

Figure 1:
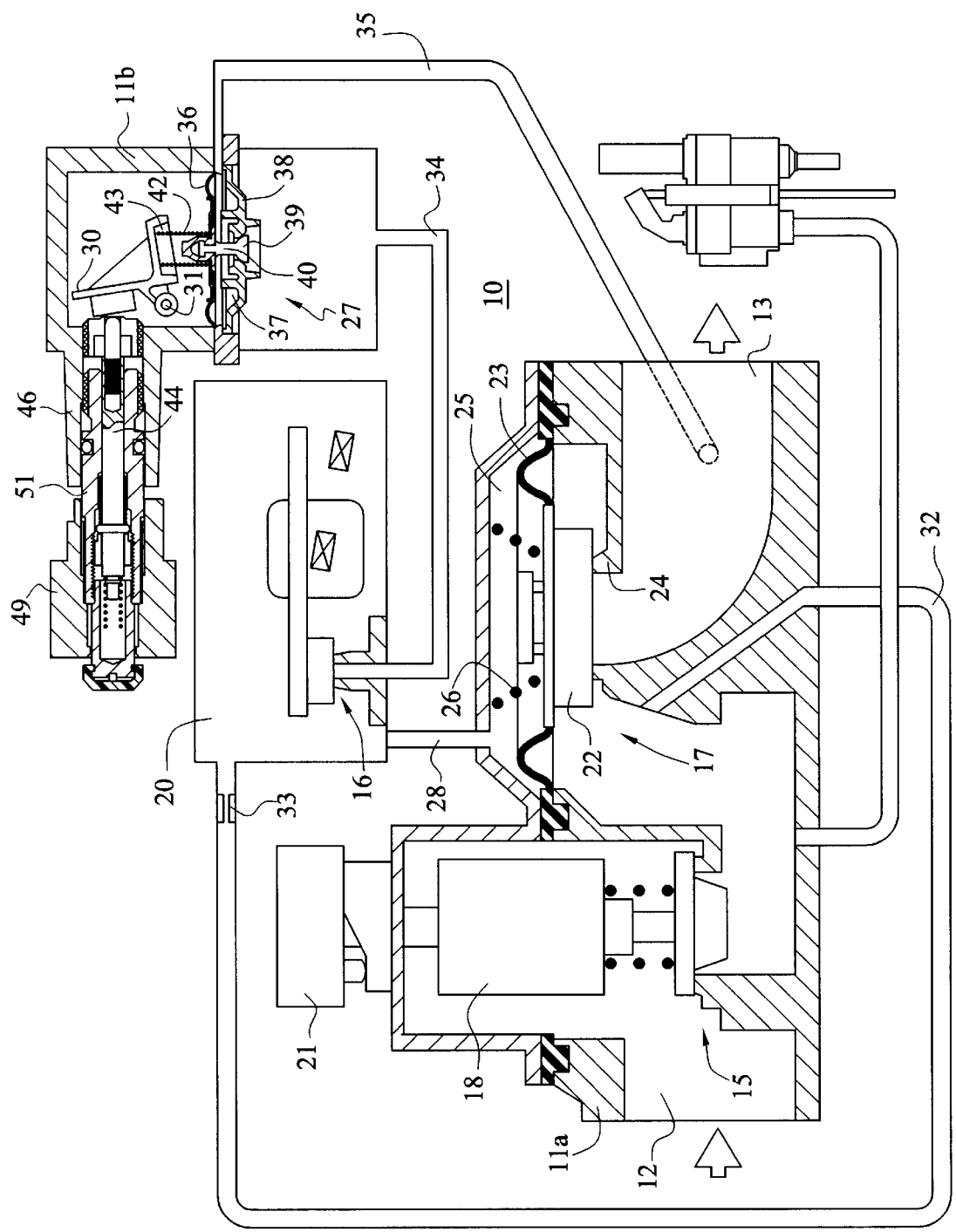
FIG. 1 illustrates a partially schematic and enlarged cross-sectional view of one embodiment of a convertible two-mode gas valve in accordance with the applicants' invention.

In FIG. 1, reference numeral 10 generally identifies a fuel gas valve, which, except for the pressure regulating portion, is similar to a gas valve of conventional design shown and described in detail in U.S. Pat. No. 4,790,352 issued Dec. 13, 1988, and assigned to the assignee of the present application. This valve, which is configured for use in a standing pilot burner system, is shown only as an example of a valve into which the applicants' invention can be incorporated. The invention is equally applicable to gas valves for burner ignition systems not incorporating standing pilots, in which case the valve is of correspondingly simpler construction.

Valve 10 includes a housing 11, which, for simplicity of illustration, is shown in two parts identified by reference characters 11a and 11b. As actually implemented, housing parts 11a and 11b would most likely be integrated into a single housing, means.

As shown in FIG. 1, housing 11 defines a fluid inlet passageway 12 and a fluid outlet passageway 13 connected through a series of valves, generally identified by reference numerals 15, 16, and 17, of which valve 17 will hereinafter be referred to as the main valve.

Valve 15 functions as a safety valve having a power unit 18 which may be controlled by a flame sensing thermocouple, whereby valve 15 is normally held open only if a satisfactory flame is established in an apparatus incorporating gas valve 10. For purposes of initially establishing the flame, valve 15 may be temporarily manually held open by means of a control knob 21.

Valve 16 is also controlled by a flame sensing thermocouple, and may be magnetically held open in response to a heat demand signal which may be produced by a thermostat. If a flame is no longer present or if the demand for heat is satisfied, valve 16 will close, sealing a conduit 34.

Main valve 17 includes a valve closure member 22 carried on a diaphragm actuator 23. Closure member 22 cooperates with a main valve seat 24 to vary the flow of gas between inlet passageway 12 and outlet passageway 13, provided valve 15 is open.

A pressure chamber 25 is formed between housing 11 and a first side of diaphragm 23 opposite the side on which valve seat 24 is located. A compression spring 26 within pressure chamber 25 between housing 11 and the first side of diaphragm 23 biases closure member 22 toward valve seat 24 to normally maintain valve 17 in a closed state.

Valve 17, however, may be variably opened by a pressure differential between opposite sides of diaphragm 23 as follows. Assuming valve 15 is open, the side of diaphragm 23 on which closure member 22 is mounted is subjected to the inlet gas pressure, which tends to open valve 17. However, the force produced by spring 26 is sufficient to keep valve 17 closed under normal inlet gas pressure unless the pressure in pressure chamber 25 is significantly less than the inlet gas pressure. The control pressure in chamber 25 is communicated thereto through a control pressure passageway 28, and is determined by the pressure in inlet passageway 12, the pressure in outlet passageway 13, the pressure drop through a flow restrictor 33, and an adjustable valve generally identified by reference numeral 27.

Specifically, the pressure in inlet passageway 12 is transmitted to a chamber 20 through a first conduit 32 containing flow restrictor 33. Chamber 20 is connected directly to pressure chamber 25 through control passageway or conduit 28. Chamber 20 is also connected to outlet passageway 13 through conduit 34, valve 27, and a conduit 35.

Valve 27 includes a valve actuator in the form of a diaphragm or control element 36 which cooperates with housing 11 to form a pressure chamber 37 between a first side of the diaphragm and a portion of the housing. Pressure chamber 37 is separated into two compartments by a stationary valve seat 38, the two compartments being connected to conduits 34 and 35 respectively, whereby valve seat 38 provides for fluid communication between conduits 34 and 35.

Diaphragm 36 carries a valve closure member 39 on a stem 40 which extends through valve seat 38 to control fluid flow between conduits 34 and 35. The deflection of diaphragm 36 and the position of closure member 39 relative to valve seat 38 are controlled by the pressure in outlet passageway 13, as communicated through conduit 35, and the force exerted on the opposite side of diaphragm 36 by a regulator spring 42. Regulator spring 42 has a first end seated on the second side of diaphragm 36 and a second end seated in a recess 43 of a lever assembly 30.

In operation, for any position of lever assembly 30 and hence recess 43, if the pressure in outlet passageway 13 decreases, the pressure on the side of the diaphragm opposite spring 42 likewise decreases, and spring 42 deflects diaphragm 36 downwardly, thus moving closure member 39 away from valve seat 38. This opens valve 27 and decreases the pressure in conduit 28 and pressure chamber 25 by allowing the pressure in chamber 20 to bleed off to outlet passageway 13. The reduced pressure in pressure chamber 25 causes diaphragm 23 to deflect upwardly, thus opening main valve 17 and restoring the pressure in outlet passageway 13 to the value determined by the position of lever 30 about a pivot axis 31.

Figure 2:
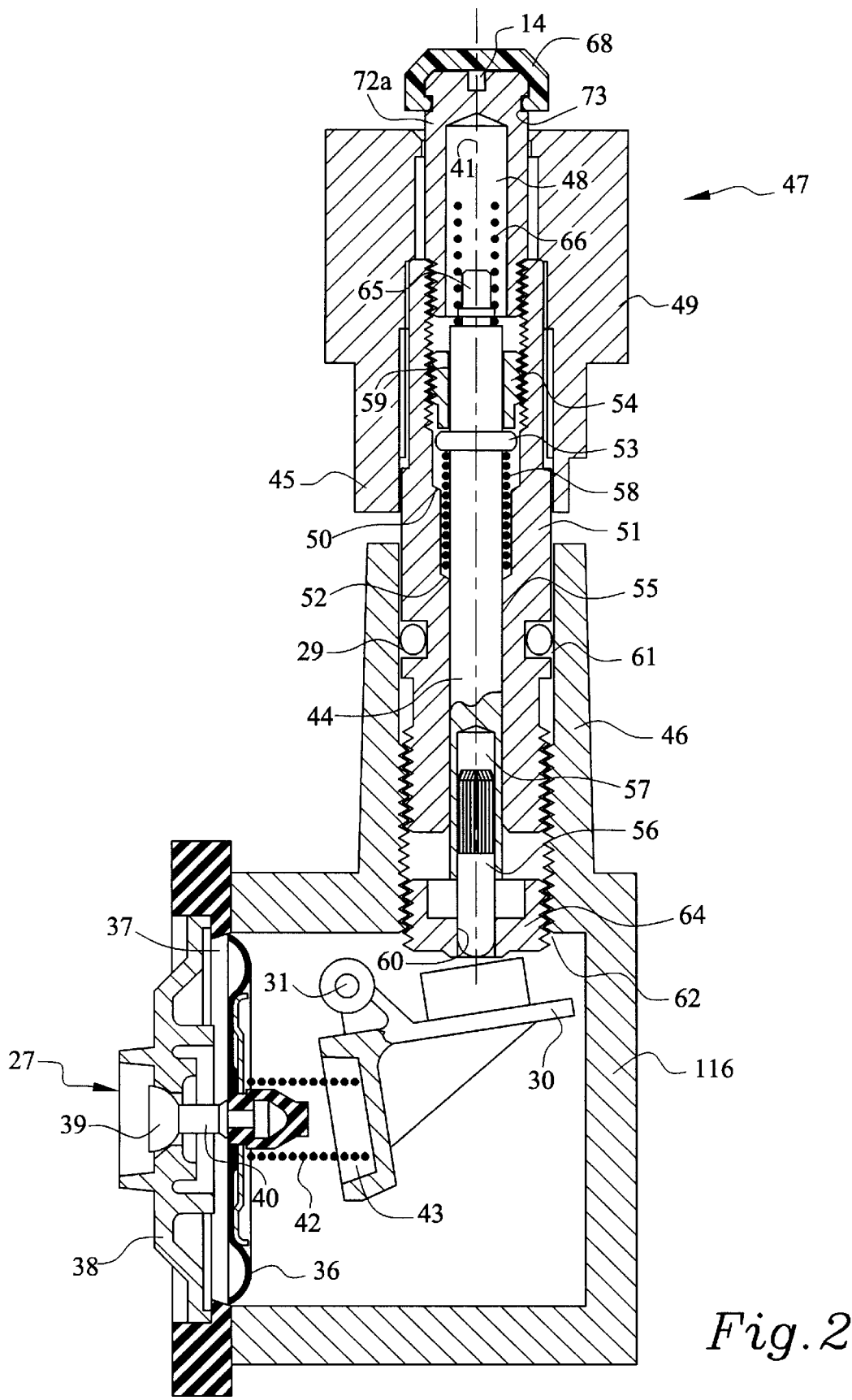
FIG. 2 is an enlarged cross sectional view of the pressure regulator adjustment apparatus and valve used in FIG. 1, the pressure regulator adjustment apparatus being configured for natural gas operation.

As shown now in FIG. 2, the position of lever 30 about pivot axis 31 is determined by the extension or retraction of a pin 56 along an axis 41 (FIG. 2–5). The movement of pin 56 is controlled by a manually operated selector assembly generally identified by reference numeral 47 which may be configured to select a desired pressure range, such as the range suitable for either natural gas or LP gas. Selector assembly 47 includes an exchangeable cap 72a or 72b, which allows for conversion between two different pressure ranges.

The above-described arrangement including lever assembly 30 facilitates compact value construction. If compactness is not important, lever assembly 30 may be eliminated, and regulator spring adjustment apparatus to be described hereinafter may be reoriented to act directly on regular spring 42.

The regulator spring adjustment apparatus includes a moveable support assembly or carriage, shown in the form of a barrel 51, centered on and extending along axis 41 through an opening in a knob 49. A first end of barrel 51 contains an externally threaded portion which engages an internally threaded boss 46 of housing part 11b. The mating threads permit the position of tubular barrel 51 to be adjusted relative to housing part 11b along axis 41.

A moveable shaft assembly or stop element generally identified by reference numeral 44 is mounted in a longitudinal bore 55 through tubular barrel 51 for movement relative thereto along axis 41. The shaft assembly is moveable between an annular shoulder or stop structure 50, within barrel 51, and an inner stop structure 54. Shaft assembly 44 is initially biased toward inner stop 54 within tubular barrel 51 by means of a compression spring 58 between an annular shoulder 52 and an annular ridge 53.

Shaft assembly 44 includes a tubular section with a first end containing a cylindrical opening 57. The cylindrical opening 57 is sized appropriately so as to receive and retain pin 56, which may be a roll pin or a solid pin with a knurled surface, by means of friction, soldering, welding, or the like.

Pin 56 extends from a location within the cylindrical opening 57 to a location outside the lower end of shaft assembly 44, as shown in FIG. 2. The second end of shaft assembly 44 includes a spring retainer 65 for securing a compression spring 66 to the shaft.

Moveable inner stop 54 is positioned within barrel 51 and threadably engaged therewith by means of mating internal threads of the barrel and external threads on the inner stop. Inner stop 54 is also formed with a longitudinal opening 59 therethrough for guiding the movement of the shaft assembly 44 along axis 41.

Exchangeable cap 72a at the upper end of the selector assembly 47 includes a bore 48 along axis 41 for receiving and seating one end of compression spring 66. The depth of bore 48 is chosen for each exchangeable cap such that compression spring 66 remains in a specific state of compression. In the preferred embodiment, the depth of bore 48 is chosen to either compress or uncompress compression spring 66. Exchangeable cap 72a is also formed with an aperture 14 disposed within the upper portion to allow a user to impart a rotational force to the cap with a suitable tool. Consequently, a removable cover 68 may be disposed over aperture 14 and secured into an annular grove 73 in the cap to prevent users from removing or tampering with cap 72a.

Selector assembly 47 includes hollow knob 49 positionable about tubular barrel 51 and secured to the barrel by means of friction, a locking screw, or the like. Hollow knob 49 is removable to permit access to inner stop 54 and compression springs 66 and 58 to permit assembly and adjustment thereof. The upper end of knob 49 is open to permit insertion of removable cap 72a into tubular barrel 51. Hollow knob 49 may also be repositioned with respect to tubular barrel 51 in response to an adjustment of the initial configuration for the desired firing rate and extension of regulator spring 42.

An adjustable outer stop element 64, having an inner bore 60, is positioned at the lower end of tubular barrel 51 in an opening 62 of housing 11b. Outer stop 64 is threadably engaged with housing 11b by means of mating external threads on the stop and internal threads in opening 62. The adjustable feature of outer stop 64 provides a means for configuring the low firing rate of valve 10 for the natural gas pressure range, as will be described hereinafter.

As shown in FIG. 2, selector assembly 47 is in its retracted position in which shaft assembly 44 is limited in travel in a first direction by inner stop 54. This position of shaft assembly 44 is suitable for lower pressure ranges, such as those associated with natural gas. With selector assembly 47 in its retracted position, recess 43 on lever assembly 30 is retracted as far as possible. Thus, regulator spring 42 is in a state of maximum extension and exerts a minimum amount of force on diaphragm 36 thereby causing valve 10 to provide minimum regulated outlet pressure. The conditions which result in the retraction of recess 43 can be understood by observing that pin 56 is withdrawn into outer stop 64 since shaft assembly 44 is at its upper limit of travel as determined by inner stop 54 in tubular barrel 51. The position of tubular barrel 51 relative to housing 11b is determined by the adjustment of tubular barrel 51 by means of the external threads on the lower portion of the barrel and internal threads in boss 46.

When a high firing rate is called for and a clockwise rotational force is applied to knob 49 this causes tubular barrel 51 to be rotated downward into threaded boss 46. This movement of tubular barrel 51 is transmitted to recess 43 through lever assembly 30, which, in turn, compresses regulator spring 42 to a position determined by the adjustment provided by the mating threads on the barrel and boss 46.

Also shown in FIG. 2 is an annular groove 61, which surrounds tubular barrel 51 for receiving an O-ring 29 which provides a rotary seal between threaded boss 46 and tubular barrel 51.

As stated previously, reference numeral 58 identifies a compression spring between annular shoulder 52 and annular ridge 53 to bias shaft assembly 44 in the first direction and relieve the force on lever assembly 30 and regulator spring 42. As illustrated by FIG. 2, if compression spring 66 is compressed in exchangeable cap 72, it will exert a greater force than compression spring 58, thereby overriding the operation of compression spring 58 and biasing shaft assembly 44 in the second direction until annular ridge 53 is in contact with annular shoulder 50. This second position of shaft assembly 44 is suitable for higher pressure ranges, such as those associated with LP gas.

Figure 3:
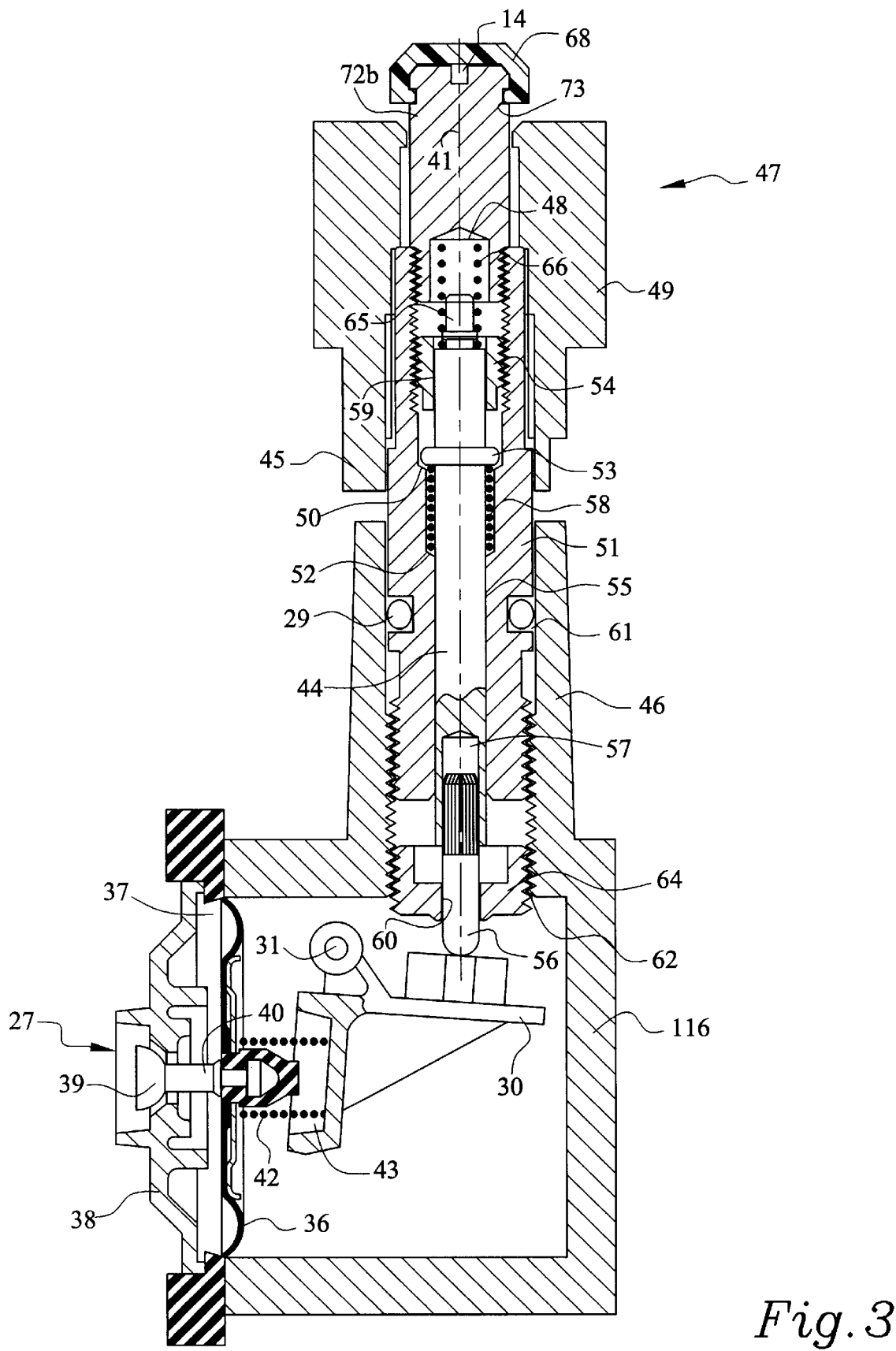
FIG. 3 is an enlarged cross sectional view of the pressure regulator adjustment apparatus and valve used in FIG. 1, the pressure regulator adjustment apparatus being configured for LP operation.

In FIG. 3, the various elements of the pressure regulator adjustment apparatus are identified by the same reference numerals as those elements in FIG. 2. Selector assembly 47 is now shown in its extended LP gas position. Selector assembly 47 is retained in that position by compression spring 66 and exchangeable cap 72b as well as the engagement of external threads on tubular barrel 51 with internally threaded boss 46. As illustrated, with selector assembly 47 in the LP gas position, annular ridge 53 establishes the downward travel limit for shaft assembly 44. In both FIGS. 2 and 3, the lower and upper travel limit for tubular barrel 51 is established by a fixed stop (not shown) on valve housing 11b. A knob extension 45 is positioned such that rotation of selector assembly 47 will cause the knob extension to contact a fixed stop, limiting rotation to approximately 300 degrees. Thus, when shaft assembly 44 is biased in the second direction by compression spring 66, corresponding to the LP gas setting, upward travel of tubular barrel 51 and hence shaft assembly 44 is determined by knob extension 45 and the fixed stop. The minimum firing rate can then be adjusted for the LP gas setting by adjusting the depth of insertion of tubular barrel 51 into threaded boss 46 before knob 49 is fixed to the barrel 51.

As is apparent from examination of FIGS. 2 and 3, when exchangeable cap 72b is selected with a shallow bore 48, compression spring 66 is compressed and shaft assembly 44 is biased toward annular shoulder 50. If knob 49 is then rotated to its counterclockwise low LP gas position, tubular barrel 51 as well as shaft assembly 44 are retracted from housing 11b, and the upward travel of tubular barrel 51 and shaft assembly 44 is established by the contact of knob extension 45 and the fixed stop on housing 11b (not shown). The rotation of knob 49 thus results in maximum high and low firing rate extensions of regulator spring 42, and pressure regulation to a higher pressure range suitable for use with LP gas. Conversely, replacement of cap 72b with a cap having a deeper bore 48 causes compression spring 66 to expand and bias shaft assembly 44 upward until contact is made with inner stop 54. This allows regulator spring 42 to expand and provides for pressure regulation to a lower pressure range suitable for use with natural gas.

Figure 4:
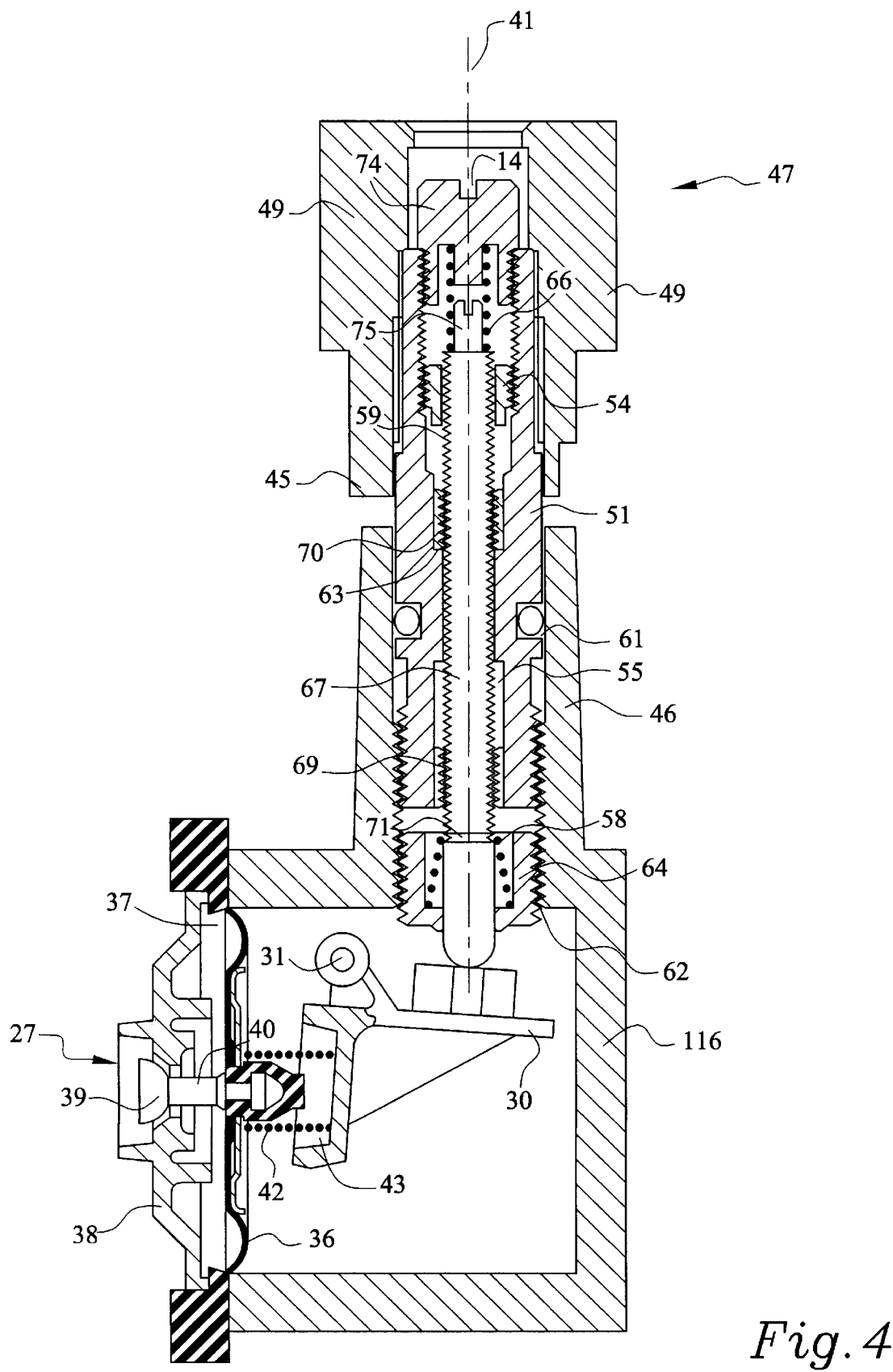
FIG. 4 is an enlarged cross-sectional view of an alternative embodiment of a pressure regulator adjustment apparatus in accordance with the applicants' invention, this embodiment configured for LP operation.

The embodiment of the invention shown in FIG. 4 is similar to that shown in FIGS. 2 and 3 except primarily for implementation of moveable stops to limit the travel of shaft assembly 44 within tubular barrel 51, and the replacement of cap 72 with an alternative cap 74. In FIG. 4, reference numeral 70 generally identifies a positionable upper stop which establishes the downward travel limit for a shaft assembly 67. Upper stop 70 is analogous to annular ridge 53 on shaft assembly 44 of FIG. 2 and limits the downward travel of shaft assembly 67 when in contact with annular shoulder 63.

Pin 56 within cylindrical opening 57 of shaft assembly 44 in FIG. 2 has been replaced by a solid shaft extending through outer stop 64 in housing 11b. Shaft assembly 67 also incorporates a groove 71 for retaining compression spring 58 between outer stop 64 and the lower portion of the shaft assembly. Since compression spring 66 may be removed in this embodiment, a spring retainer 75 over which spring 66 extends is preferably smooth to allow the spring to slide on and off easily.

As previously described in FIG. 2, the selector assembly 47 of FIG. 4 also contains compression springs 58 and 66 for biasing shaft assembly 67 toward or away from lever assembly 30. In the embodiment shown in FIG. 4, a first end of compression spring 58 is secured to groove 71 on shaft assembly 67. A second end of compression spring 58 may be secured to outer stop 64. If it is desired to configure the selector assembly for natural gas, cap 74 may be detached and compression spring 66 removed. If compression spring 66 is removed, compression spring 58 will bias shaft assembly 67 upward until upper stop 70 contacts inner stop 54.

As shown in FIG. 4, when selector assembly 47 is rotated clockwise to the maximum firing rate, tubular barrel 51 is fully extended into threaded boss 46 and the contact between lower stop 69 and outer stop 64 limits the downward travel and compression of regulator spring 42. Thus, regulator spring 42 is in a state of maximum compression and exerts a maximum amount of force on diaphragm 36 thereby causing valve 10 to provide maximum regulated outlet pressure.

Figure 5:
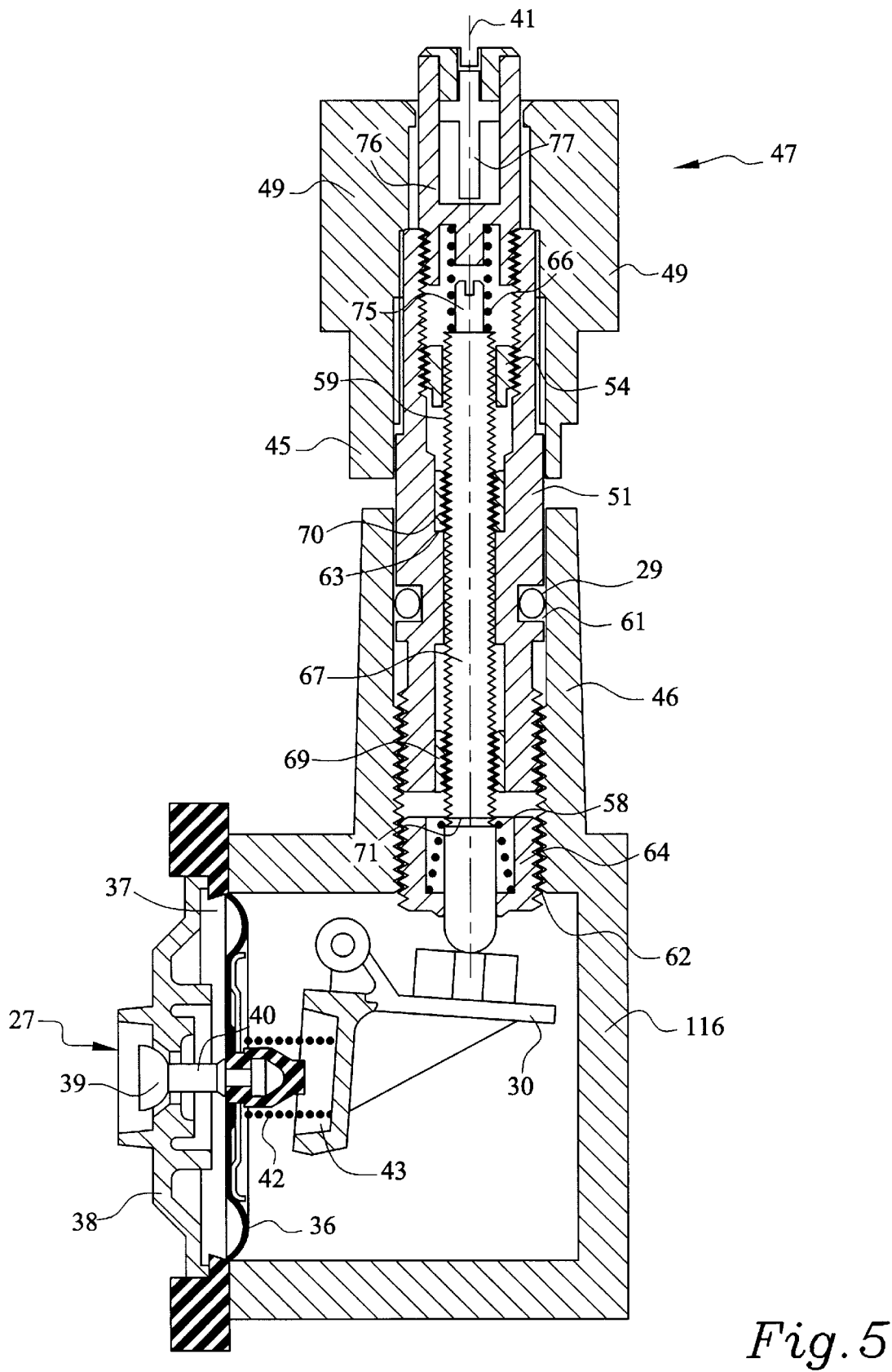
FIG. 5 is another enlarged cross-sectional view of an alternative embodiment of a pressure regulator adjustment apparatus in accordance with the applicants' invention, this embodiment positioned in its LP setting.

In FIG. 5, the various elements of the pressure regulator adjustment apparatus are identified by the same reference numerals as those elements in FIG. 4. As illustrated in FIG. 5, a removable cap 76 may contain an indicator of the pressure range of the valve, generally identified by reference numeral 77. Indicator 77 may be colored to allow a user to recognize the present configuration or pressure range of the selector assembly 47. In addition, when it is desired to operate the selector assembly 47 in the natural gas mode, compression spring 66 may be removed and stored in cap 76. Indicator 77 may thus be positioned entirely within cap 76 to indicate the LP configuration, and biased upward by compression spring 66 through cap 76 for the natural gas setting.

In accordance with the foregoing discussion, a manually adjustable pressure regulator adjustment apparatus is provided with four individually adjustable compressions corresponding to at least four regulated output pressures. Thus, manually selectable high and low firing rate pressures can be provided for each of two manually selectable pressure ranges. Further, conversion between the pressure ranges is accomplished with minimal replacement of any valve components, and no adjustments are required when converting from one pressure range to another.

Although a particular embodiment has been shown and described for illustrative purposes, various modifications and other embodiments in accordance with the applicants' teaching will be apparent to those of ordinary skill in the relevant arts. It is not intended that coverage be limited to the embodiments shown, but only by the terms of the following claims.

What is claimed is:

1. In a flow control device of the type which varies fluid flow as a function of force exerted on a control element by a regulator spring extending between the control element and a seat, improved apparatus for providing a plurality of independently adjustable seat positions comprising:

a first stop element whose position is adjustable relative to the control element along an axis, said first stop element having first and second opposing stop surfaces of which the first stop surface establishes a limiting position of the seat in a first direction;

a second stop element whose position is adjustable relative to the control element along the axis, said second stop element establishing stop positions of the seat away from said first stop element, the stop positions being determined in part by the second stop surface of said first stop element;

a carriage mounted for variable positioning relative to the control element along the axis, and carrying said second stop element for sliding movement in said carriage between a first stop structure in a direction away from the seat and a second stop structure in a direction toward the seat, positioning of said second stop element against the first and second stop structures respectively permitting positioning of the seat in its limiting position in the first direction, and, in part, establishing a limiting position of the seat in a second direction opposite the first direction;

a first biasing means biasing said second stop element toward the first stop structure of said carriage;

a second biasing means for selectively biasing said second stop element toward the second stop structure of said carriage, said second biasing means being operable when selected, to overcome the bias imparted by said first biasing means, and a selector device for selecting operation of said second biasing means.

2. The flow control device of claim 1 wherein said first stop element comprises:

a tubular structure concentric with the axis, disposed about said second stop element for allowing slidable movement thereof.

3. The flow control device of claim 1 wherein said second stop element comprises:

a shaft having a longitudinal opening centered within a first end thereof; and a pin positioned within said longitudinal opening.

4. The flow control device of claim 1 further comprising:

stationary structure proximate said carriage having a threaded surface thereon which cooperates with a threaded surface on said carriage to permit axial repositioning of said carriage relative to the control element.

5. The flow control device of claim 1 wherein said selector device comprises:

a positioning member having an axial bore disposed at least partially therethrough for selectively biasing said second stop element toward the second stop structure of said carriage, said positioning member being threadably engaged with said carriage.

6. In a pressure regulator of the type having:

a housing defining a servo regulator valve seat and enclosing a closure member which variably restricts flow through the valve seat in response to the force transmitted by a regulator spring of which one end is positioned by a moveable spring retainer biased toward a first positional limit relative to the housing, the improvement which comprises;

a tubular barrel extending along a first axis fixed relative to the housing, said tubular barrel having a longitudinal bore therethrough;

a connection between the housing and said tubular barrel which provides for maintaining said tubular barrel at any position relative to the housing within a range of positions along the first axis;

an outer stop member operatively connected to the housing for adjustable positioning along the first axis, and having a first stop surface thereon which determines the first positional limit for the spring retainer;

a shaft assembly mounted within the barrel for movement relative thereto along the first axis, said shaft assembly having first and second ends, of which the first end is adapted to extend through an opening through said outer stop member; and a positioning arrangement for positioning said shaft assembly relative to said barrel at any of a plurality of positions along the first axis, whereby the first end of said shaft assembly provides a variable position stop for the spring retainer.

7. The pressure regulator of claim 6 wherein said shaft assembly comprises:

a shaft extending along the first axis, and having a longitudinal bore in a first end thereof; and a pin mounted in the bore and extending beyond the first end of said shaft.

8. The pressure regulator of claim 7 wherein the extension of said pin beyond the first end of said shaft is adjustable along the first axis.

9. The pressure regulator of claim 7 wherein said pin is a roll pin which provides an interference fit within the bore in the first end of said shaft.

10. The pressure regulator of claim 7 wherein said shaft is formed with an outwardly extending annular ridge which, in cooperation with a first shoulder on the longitudinal bore through said tubular barrel, functions to limit travel of said shaft relative to said tubular barrel in a first direction toward the spring retainer along the first axis.

11. The pressure regulator of claim 10 further comprising an inner stop member operatively connected to said tubular barrel for adjustable positioning along the first axis and operable to limit the travel of said shaft assembly within said tubular barrel in a second direction along the first axis away from the spring retainer.

12. The pressure regulator of claim 6 further including an O-ring fitted around said tubular barrel between said tubular barrel and the housing.

13. The pressure regulator of claim 11 further including:

a second shoulder on the longitudinal bore through said tubular barrel; and a first biasing spring disposed between said second shoulder and the annular ridge on said shaft, said first biasing spring biasing said shaft in the second direction along the first axis.

14. The pressure regulator of claim 6 wherein:

the closure member is moveable relative to the valve seat along a second axis transverse to the first axis;

the spring retainer is formed on one end of a lever, the other end of which positioned to contact the variable position stop provided by said shaft assembly, the lever being pivotable about a third axis transverse to the first and second axes; and the regulator spring operates to bias said other end of the lever toward said shaft assembly.

15. The pressure regulator of claim 13 further comprising:

a selector device operatively connected to said tubular barrel;

a second biasing spring operably disposed between said shaft assembly and said selector device for selectively biasing said shaft assembly in the second direction, the spring constant of said second biasing spring being larger than that of said first biasing spring, whereby, when operation of said second biasing spring is selected, said second biasing spring overcomes the bias provided by said first biasing spring.

16. The pressure regulator of claim 15 wherein:

said first and second biasing springs are compression springs, said second biasing spring being positioned between said selector device and the second end of said shaft assembly.

17. The pressure regulator of claim 16 wherein:

said outer stop member has a second stop surface thereon opposing the first stop surface; and when operation of said second biasing spring is selected, said second biasing spring causes said shaft assembly to move in the first direction along said first axis to a position in which the first end of said shaft is in contact with the second stop surface on said outer stop member.

18. The pressure regulator of claim 16 wherein said selector device comprises first and second exchangeable caps having spring seats thereon, each cap, when connected to said barrel providing a discrete spacing between its spring seat and the second end of said shaft assembly.

19. The pressure regulator of claim 16 wherein said selector device comprises a reversible cap having first and second spring seats thereon, which provide discrete compressions of said second biasing spring.

20. The pressure regulator of claim 6 wherein:

said connection between the housing and said tubular barrel comprises mating internal threads on the housing and external threads on said tubular barrel; and a knob is provided on said tubular barrel for facilitating rotation thereof relative to the housing.

21. A method of calibrating a pressure regulating valve of the type which produces any one of four predetermined selectable outlet pressures, the outlet pressure being determined by the force exerted by a regulator spring of which one end is positioned by a spring seat whose position relative to the valve housing is variable, the spring seat being biased in a first direction by the regulator spring against a stop formed by a stop assembly including an outer stop member having inner and outer stop surfaces mounted in the housing and adjustable along an axis, a tubular barrel having a bore therethrough mounted in the housing and extending along the axis, a shaft assembly of variable length mounted in the bore in the tubular barrel and slideable relative thereto along the axis, the shaft assembly being adapted to variably extend through the outer stop member to a limit position established in part by an inner stop surface on the outer stop, and means for selectively positioning the shaft assembly against a first variable position inner stop in the tubular barrel in a direction away from the spring retainer or in a direction toward the spring retainer against a second variable position stop in the tubular barrel or the inner stop surface of the outer stop member, the method comprising the steps of:

positioning the shaft assembly against the first inner stop member in the tubular barrel;

adjusting the outer stop member to position the spring retainer in a first position relative to the housing corresponding to a first desired outlet pressure;

positioning the shaft assembly against the inner stop surface of the outer stop member;

adjusting the length of the shaft assembly so that the end thereof extends beyond the outer stop surface by an amount sufficient to position the spring retainer in a second position relative to the housing corresponding to a second desired outlet pressure;

adjusting the position first inner stop in the tubular barrel away from the spring retainer by an amount to sufficiently withdraw the first end of the shaft assembly to locate the spring retainer in a third position relative to the housing corresponding to a third desired outlet pressure;

positioning the shaft assembly against the second stop in the barrel assembly; and adjusting the position of the second stop in the tubular barrel relative to the housing to position the spring retainer in a fourth position relative to the housing corresponding to a fourth desired outlet pressure.

* * * * *